March 6, 1928.
T. C. BABBITT ET AL
1,661,552
CLEANING TOOL
Filed March 6, 1926
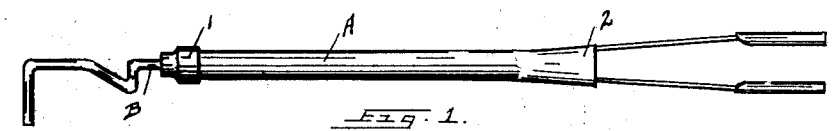
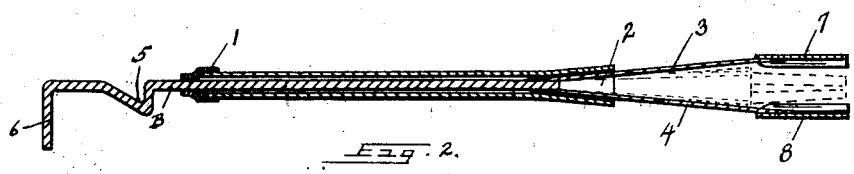
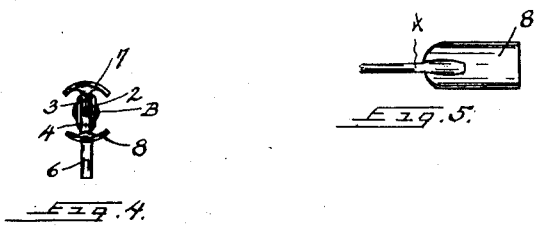
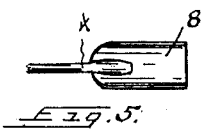

Patented Mar. 6, 1928.

1,661,552

UNITED STATES PATENT OFFICE.

TILLMAN C. BABBITT AND CLARENCE E. HOPFENBECK, OF SALT LAKE CITY, UTAH.

CLEANING TOOL.

Application filed March 6, 1926. Serial No. 92,971.

Our invention relates to cleaning tools and has for its object to provide a new and efficient tool for cleaning out valves, curb-boxes and hydrants.

A further object is to provide a tool which can be used in curb-boxes or other limited spaces to clean out any sediment or gravel accumulated therein.

These objects we accomplish with the device illustrated in the accompanying drawings in which similar letters and numerals of reference indicate like parts throughout the several views, and described in the specification forming a part of this application and pointed out in the appended claim.

In the drawings in which we have shown the best and most substantial embodiment of our invention, Figure 1 is a side elevation of our cleaning tool. Figure 2 is a longitudinal section of the tool. Figure 3 is an elevation of the tool with the slidable housing removed. Figure 4 is an end elevation of the tool. Figure 5 is a view of one of the scoop members used on the grappling end of the tool, enlarged from the other views.

In the drawings we have shown the cylindrical slidable housing as A, and one end of said housing is externally threaded to receive the reducer 1. The other end of said housing A is slightly flattened elliptically and is used to draw the grappling scoops toward each other. A round rod B has two tool steel rods 3 and 4 attached by welding or brazing to form a bifurcated end portion on said rod. The rod B is then placed within the said housing and a crimp or short offset 5 is formed near the other end of said rod to limit the movement of the housing. The extreme end portion of said rod B is bent to form a handle 6 for the tool. Grasping scoops 7 and 8 are attached by welding or riveting to the free ends of said rods 3 and 4. The scoops are semi-cylindrical in cross section, and when the housing A is moved near or in contact with the upper ends of said scoops they form opposing segments of a cylinder, as shown in Figure 4.

To operate our device or tool, the housing is slid longitudinally to near the crimp 5 and the scoop end of the tool is inserted into the curb-box, hydrant or valve which is clogged, and the scoops thrust into the sediment or material lodged or found therein. The housing is then moved longitudinally on the rod B toward the scoops. The elliptical end 2 sliding on the rods 3 and 4 will force the scoops 7 and 8 toward each other and into gripping contact with whatever sediment or material is between them and the tool is then withdrawn from the box, hydrant or other clogged member, with its load of sediment, soil, gravel or other loose material. The housing is then slid toward the handle and the scoops release the material grappled. A continuation of these movements will clean out the box, hydrant or valve which has been clogged.

Having thus described our invention we desire to secure by Letters Patent and claim:—

In a cleaning tool the combination of a stem; a handle portion bent in one end thereof; two rods attached to the other end thereof; a gripping scoop attached on the free ends of each rod; a slidable housing carried on said rods and said stem; a flattened portion on one end of said housing to fit said two rods and hold them in fixed relation diametrically to each other; and a reducer secured on the other end of said housing having the inner hole the same size as the stem and of a smooth bore.

In testimony whereof we have affixed our signatures.

TILLMAN C. BABBITT.
CLARENCE E. HOPFENBECK.